US012717305B2

(12) United States Patent
Bailey et al.

(10) Patent No.: US 12,717,305 B2
(45) Date of Patent: Aug. 25, 2026

(54) DYNAMICALLY MODIFYING PRINT CODES

(71) Applicant: INTERNATIONAL BUSINESS MACHINES CORPORATION, Armonk, NY (US)

(72) Inventors: Logan Bailey, Atlanta, GA (US); Zachary A. Silverstein, Georgetown, TX (US); Alexandra M Isaly, Lighthouse Point, FL (US); Wesley Ip, Arlington, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 427 days.

(21) Appl. No.: 18/470,519

(22) Filed: Sep. 20, 2023

(65) Prior Publication Data

US 2025/0093846 A1 Mar. 20, 2025

(51) Int. Cl.
*G05B 19/4099* (2006.01)
*B33Y 50/02* (2015.01)

(52) U.S. Cl.
CPC .......... *G05B 19/4099* (2013.01); *B33Y 50/02* (2014.12); *G05B 2219/36019* (2013.01); *G05B 2219/49023* (2013.01)

(58) Field of Classification Search
CPC ...... G05B 19/4099; G05B 2219/36019; G05B 2219/49023; B33Y 50/02
See application file for complete search history.

(56) References Cited

U.S. PATENT DOCUMENTS

| | | | | |
|---|---|---|---|---|
| 11,511,373 | B2 | 11/2022 | Penny | |
| 12,511,630 | B2 * | 12/2025 | Marinkovich | B22F 10/85 |
| 2017/0052516 | A1 * | 2/2017 | Minardi | B29C 64/118 |
| 2018/0101167 | A1 * | 4/2018 | DehghanNiri | G01N 29/12 |

(Continued)

OTHER PUBLICATIONS

Henson, et al., “A Digital Twin Strategy for Major Failure Detection in Fused Deposition Modeling Processes”, Elsevier,, ScienceDirect, 49th SME North American Manufacturing Research Conference, NAMRC 49, 2021, pp. 359-367.

(Continued)

*Primary Examiner* — Ziaul Karim
(74) *Attorney, Agent, or Firm* — Steven M. Bouknight

(57) ABSTRACT

An embodiment for dynamically modifying print codes to accommodate printing errors. The embodiment may track print data associated with a printing operation against a set of desired specifications. The embodiment may identify a defect in the printing operation based on the tracked print data. The embodiment may, in response to identifying the defect associated with the printing operation, pause the printing operation. The embodiment may generate remediating g-code alterations based on the identified defect and the set of desired specifications. The embodiment may generate a first digital twin corresponding to the set of desired specifications, and a second digital twin corresponding to the generated remediating g-code alterations. The embodiment may rebase the paused printing operation based on the generated remediating g-code alterations and the first and second digital twins. The embodiment may leverage the generated remediating g-code alterations to resume the rebased paused printing operation.

17 Claims, 3 Drawing Sheets

(56) References Cited

U.S. PATENT DOCUMENTS

| | | | | |
|---|---|---|---|---|
| 2018/0162066 | A1* | 6/2018 | Bruwer | G05B 19/4099 |
| 2018/0297114 | A1* | 10/2018 | Preston | B29C 64/165 |
| 2020/0254683 | A1* | 8/2020 | Rumpf | B29C 64/209 |
| 2021/0223757 | A1 | 7/2021 | Chin | |
| 2021/0370398 | A1* | 12/2021 | Preston | B22F 10/12 |
| 2021/0387416 | A1* | 12/2021 | Mark | B33Y 10/00 |
| 2022/0091580 | A1* | 3/2022 | Bandara | B22F 10/80 |

OTHER PUBLICATIONS

IBM, "The new software-defined supply chain", IBM Global https://www.ibm.com/downloads/cas/JQP1DK0L, Jun. 2013, 4 Pages.

Stumpfe, "Digital platform for industrial 3D printing", https://www.ibm.com/blog/digital-platform-for-industrial-3d-printing/, Apr. 4, 2019, 11 pages.

* cited by examiner

DYNAMICALLY MODIFYING PRINT CODES

BACKGROUND

The present application relates generally to computer processing, and more particularly, to dynamically modifying print codes to accommodate printing errors.

3D printing allows manufacturers to create three-dimensional objects layer by layer from digital models. 3D printing allows for unprecedented opportunities in a variety of industries including, manufacturing, design, healthcare, and beyond. Specifically, 3D printing provides transformative design freedom, customization, speed, and efficiency in producing complex and intricate geometries that were previously difficult or economically unviable. Businesses that successfully employ 3D printing technologies strive to gain competitive advantages by maximizing the adaptability, accuracy, and reliability of their print operations.

SUMMARY

According to one embodiment, a method, computer system, and computer program product for dynamically modifying print codes to accommodate printing errors is provided. The embodiment may include tracking print data associated with a printing operation against a set of desired specifications. The embodiment may also include identifying a defect in the printing operation based on the tracked print data. The embodiment may further include, in response to identifying the defect associated with the printing operation, pausing the printing operation. The embodiment may also include generating remediating g-code alterations based on the identified defect and the set of desired specifications. The embodiment may further include generating a first digital twin corresponding to the set of desired specifications, and a second digital twin corresponding to the generated remediating g-code alterations. The embodiment may also include rebasing the paused printing operation based on the generated remediating g-code alterations and the first and second digital twins. The embodiment may further include leveraging the generated remediating g-code alterations to resume the rebased paused printing operation.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
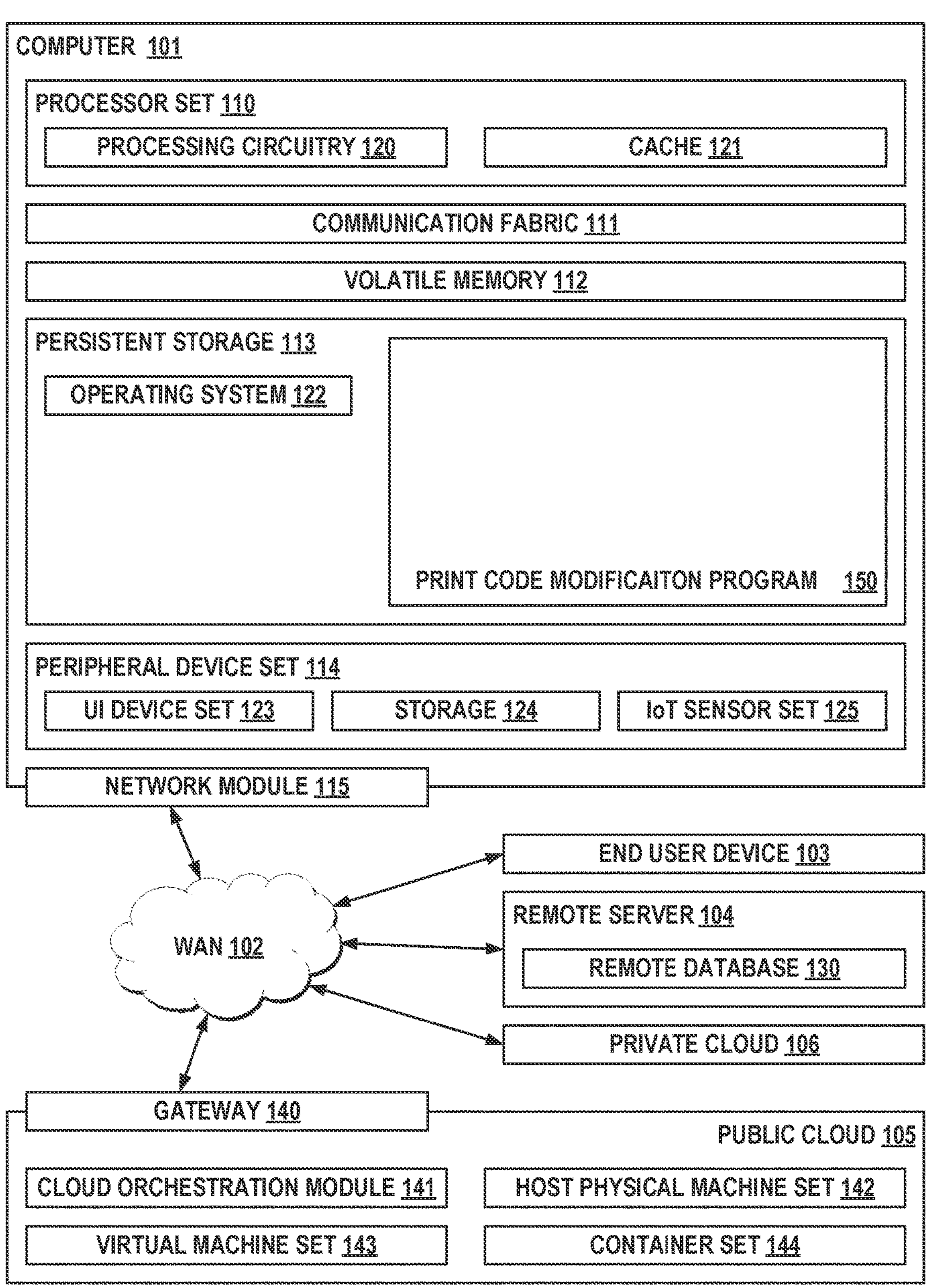
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

While this application generally discusses embodiments related to 3D printing, it is envisioned that described embodiments may be applied in environments involving 4D, 5D or any other multi-dimensional printing settings in which described methods may be implemented.

Embodiments of the present application relate generally to computer processing, and more particularly, to dynamically modifying print codes to accommodate printing errors. The following described exemplary embodiments provide a system, method, and program product to, among other things, track print data associated with a printing operation against a set of desired specifications, identify a defect in the printing operation based on the tracked print data, in response to identifying the defect associated with the printing operation, pause the printing operation, generate remediating g-code alterations based on the identified defect and the set of desired specifications, generate a first digital twin corresponding to the set of desired specifications, and a second digital twin corresponding to the generated remediating g-code alterations, rebase the paused printing operation based on the generated remediating g-code alterations and the first and second digital twins, and leverage the generated remediating g-code alterations to resume the rebased paused printing operation.

As previously described, 3D printing allows manufacturers to create three-dimensional objects layer by layer from digital models. 3D printing allows for unprecedented opportunities in a variety of industries including, manufacturing, design, healthcare, and beyond. Specifically, 3D printing provides transformative design freedom, customization, speed, and efficiency in producing complex and intricate geometries that were previously difficult or economically unviable. Businesses that successfully employ 3D printing technologies strive to gain competitive advantages by maximizing the adaptability, accuracy, and reliability of their print operations.

However, as 3D (as well as 4D, 5D, etc.) print operations become more complex, the challenge of managing and accommodating errors becomes increasingly difficult. One contributing factor to this challenge is an increasing number of variables considered in each print operation. For example, a modern exemplary 3D print operation may involve numerous variables related to temperature, material quality, bed adhesion, layer height (resolution), print speed, nozzle size, retraction settings, printer calibration settings, filament quality, slicer settings, and many more variables and design considerations. As the number of impactful variables at play for a given 3D print operation increases, the potential for errors increases with it. In certain instances, a 3D print operation that experiences an error may result in an entire print being canceled or scrapped. Canceling or scrapping a 3D print operation, rather than being able to accommodate a given error, can cost the business performing the print operation both significant amounts of time, and materials.

Accordingly, a method, computer system, and computer program product for dynamically modifying print codes to accommodate printing errors would be advantageous. The method, system, and computer program product may track print data associated with a printing operation against a set of desired specifications. The method, system, computer program product may identify a defect in the printing operation based on the tracked print data. The method, system, computer program product may then, in response to identifying the defect associated with the printing operation, pause the printing operation. The method, system, computer program product may generate remediating g-code alterations based on the identified defect and the set of desired specifications. Next, the method, system, computer program product may generate a first digital twin corresponding to the set of desired specifications, and a second digital twin corresponding to the generated remediating g-code alterations. Then, the method, system, computer program product may rebase the paused printing operation based on the generated remediating g-code alterations and the first and second digital twins. Thereafter, the method, system, computer program product may leverage the generated remediating g-code alterations to resume the rebased paused printing operation. In turn, the method, system, computer program product has provided for improved dynamic modification of print codes to accommodate printing defects or errors by tracking print data that may be leveraged to detect a defect based on the original set of desired specifications. Described embodiments leverage the desired specifications and the detected defect to generate g-code alterations that accommodate and remediate the detected defect. Described embodiments further leverage a pair of digital twins representing the desired specification and the printing operation at the time the defect was detected to rebase the printing operation before resuming the rebased paused print operation using the generated g-code alterations. This allows for the accommodation of errors related to a given 3D print operation, thereby avoiding the costs associated with scrapping or canceling the entire print.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as print code modification program/code 150. In addition to user print code modification code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and print code modification code 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in print code modification code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in print code modification program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the print code modification program 150 may be a program capable of tracking print data associated with a printing operation against a set of desired specifications. Print code modification program 150 may then identify a defect in the printing operation based on the tracked print data. Next, print code modification program 150 may, in response to identifying the defect associated with the printing operation, pause the printing operation. Print code modification program 150 may then generate remediating g-code alterations based on the identified defect and the set of desired specifications. Next, print code modification program 150 may generate a first digital twin corresponding to the set of desired specifications, and a second digital twin corresponding to the generated remediating g-code alterations. Print code modification program 150 may then rebase the paused printing operation based on the generated remediating g-code alterations and the first and second digital twins. Thereafter, print code modification program 150 may leverage the generated remediating g-code alterations to resume the rebased paused printing operation. In turn, print code modification program 150 has provided for improved dynamic modification of print codes to accommodate printing defects or errors by tracking print data that may be leveraged to detect a defect based on the original set of desired specifications. Described embodiments leverage the desired specifications and the detected defect to generate g-code alterations that accommodate and remediate the detected defect. Described embodiments further leverage a pair of digital twins representing both the desired specification and the printing operation at the time the defect was detected, to rebase the printing operation before resuming the rebased paused print operation using the generated g-code alterations. This allows for the accommodation of errors related to a given 3D print operation, thereby avoiding the costs associated with scrapping or canceling the entire print.

Figure 2:
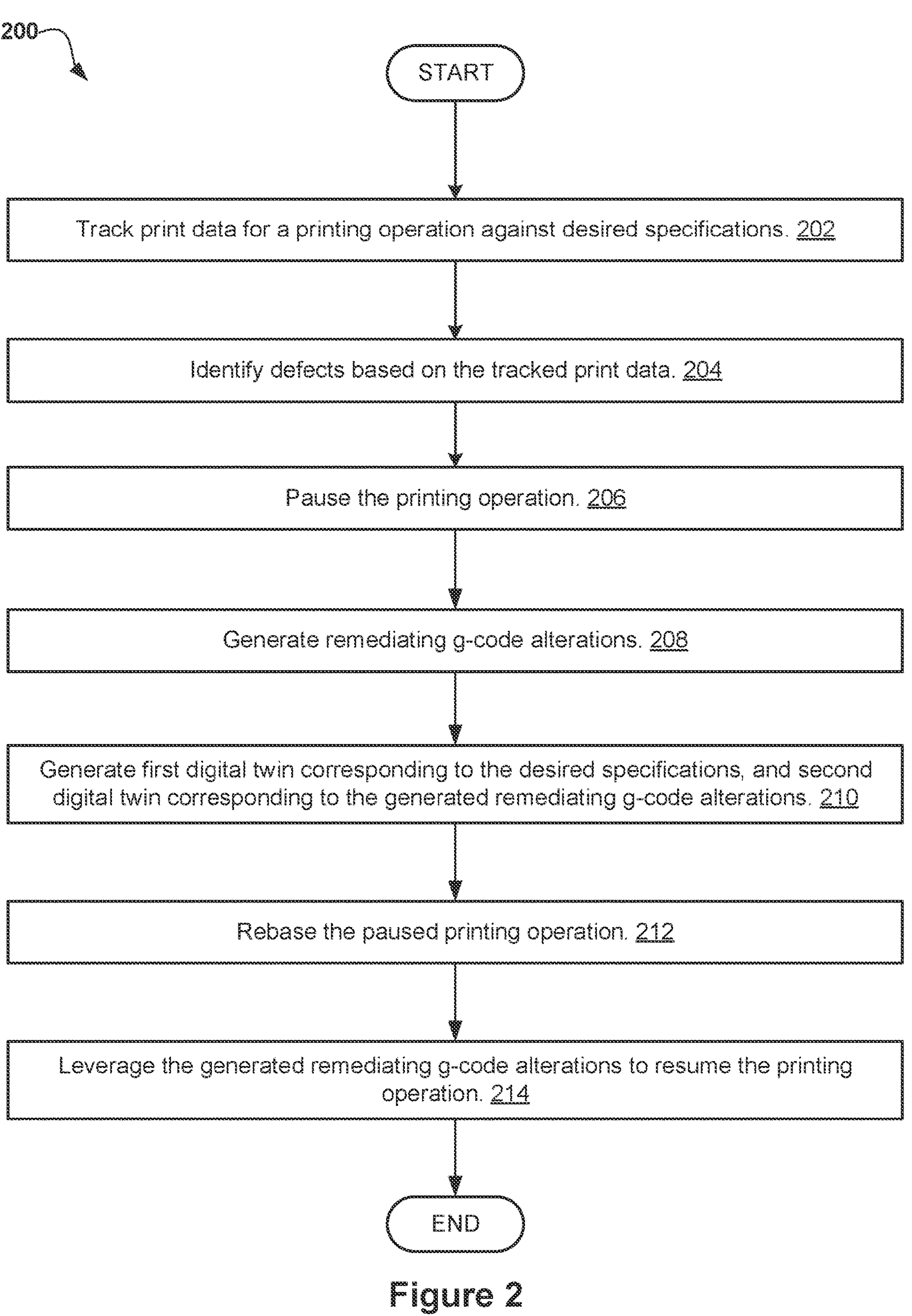
FIG. 2 illustrates an operational flowchart for an exemplary process of dynamically modifying print codes to accommodate printing errors according to at least one embodiment.
Figure 3:
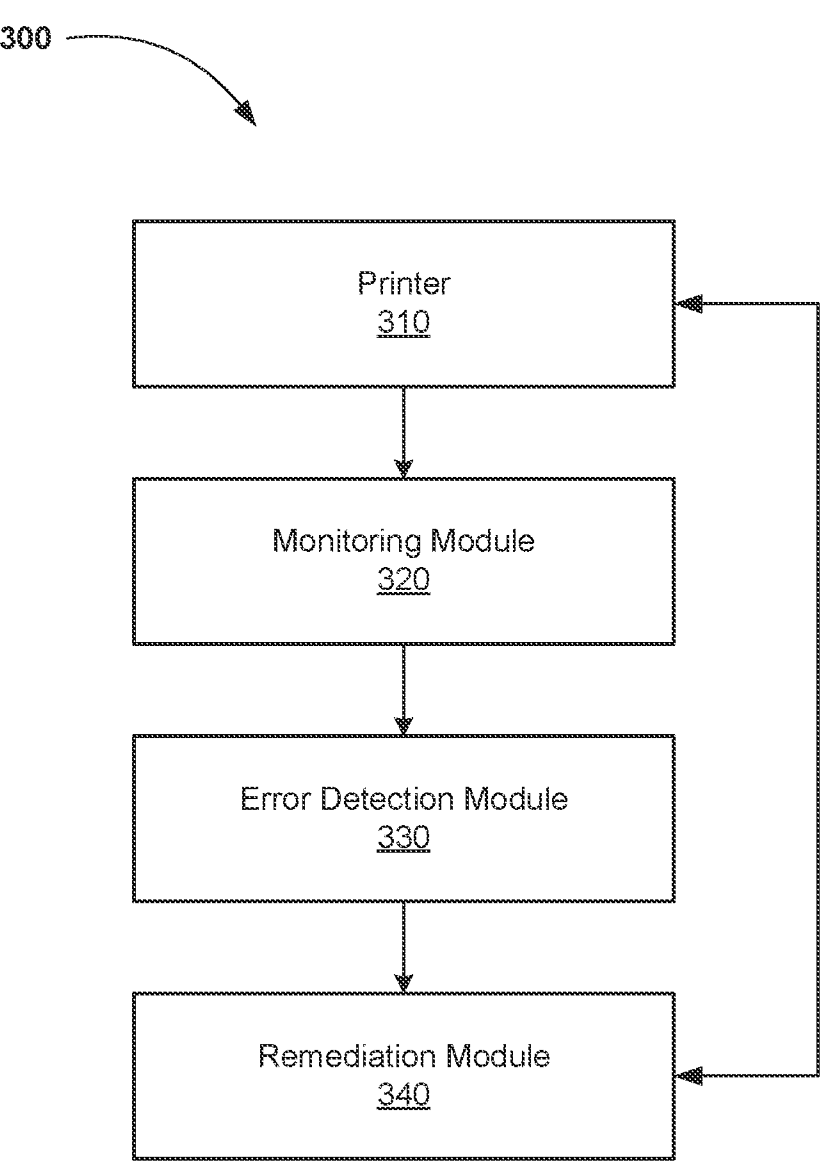
FIG. 3 depicts illustrative system architecture usable for performing an exemplary process of dynamically modifying print codes to accommodate printing errors according to at least one embodiment.

Referring now to FIG. 2, an operational flowchart for an illustrative process 200 of dynamically modifying print codes to accommodate printing errors according to at least one embodiment is provided. FIG. 3 will be discussed with reference to FIG. 2.

Specifically, FIG. 3 depicts illustrative system architecture 300 usable for performing an exemplary process of dynamically modifying print codes to accommodate printing errors according to at least one embodiment. The exemplary system architecture 300 depicted in FIG. 3 includes a printer 310, a monitoring module 320 for tracking print data for a target printing operation, an error detection module 330 for detecting defects or deviations in the target printing operation, and a remediation module 340 for generating remediating g-code alterations, and digital twins that may be leveraged to resume, and salvage, the target printing operation. The exemplary system architecture depicted in FIG. 3 will be discussed in greater detail below in connection with the description of illustrative process 200.

Returning to FIG. 2, at step 202 of illustrative process 200, print code modification program 150 may track print data associated with a printing operation against a set of desired specifications. In the context of this disclosure, the printing operation refers to any print job capable of being printed by any suitable exemplary printer 310 (see FIG. 3) which may include any known types of multi-dimensional print jobs for printable outputs involving three or more dimensions, such as, for example, 3D, 4D, etc. At this step, an exemplary monitoring module 320 (See FIG. 3) of print code modification program 150 may be leveraged to track a variety of print data associated with a target printing operation being monitored. In the context of this disclosure, the tracked print data may refer to any trackable or monitorable data associated with the printing operation. This may include at least, for example, temperature, material quality, bed adhesion, layer height (resolution), print speed, nozzle size, retraction settings, printer calibration settings, filament quality, slicer settings, and any other known variables and design considerations which may be involved in the printing operations being monitored.

To track the print data associated with the printing operation being monitored, exemplary monitoring module 320 of print code modification program 150 may be configured to leverage all available printing operation data sources. In embodiments, the available printing operation data sources may include any accessible sensors, data feeds, or other root data sources associated with exemplary printer 310 being employed to conduct the printing operation being monitored. For example, exemplary monitoring module 320 of print code modification program 150 may track data from temperature sensors, leveling sensors, endstops and limit switches, filament sensors, proximity sensors, power monitors sensors, encoder sensors, built-in cameras, print speed sensors, layer height sensor, and any other sensors, data feeds, or root data sources that are part of exemplary printer 310. Additionally, exemplary monitoring module 320 of print code modification program 150 may track data from accessible sensors, IoT data feeds, and any other available data feeds that are external to exemplary printer 310. For example, external sensors or data feeds may include webcams and cameras, filament runout sensors, ambient temperature or humidity sensors, enclosure environment sensors, lighting sensors, print bed leveling sensors and assistants, material or spoon management systems, automatic print removal systems, vibration and motion sensors, print quality monitoring systems, and any other sensors or systems that may collect or provide useful data for the printing operation being monitored. Print code modification program 150 may track and monitor the print data described above against a set of desired specifications associated with the printing operation. The set of desired specifications may include, for example, a set of instructions or geometric code (g-code) associated with the printing operation. Typically, the g-code of a given printing operation provides users with the ability to fine-tune a wide variety of parameters and variables (such as those described above). Accordingly, the tracked print data may be monitored by print code modification program 150 against the set of desired specifications for the target printing operation by leveraging the g-code or suitable set of print instructions.

At 204, print code modification program 150 may identify a defect in the printing operation based on the tracked print data. At this step, an exemplary error detection module 330 (see FIG. 3) of print code modification program 150 may be configured to identify, based on comparing the tracked data to the set of desired specifications, any deviations or defects with the printing operation. The identified defects may include any known defects that may be detectable using the tracked print data from step 202. For example, identified defects may include, layer adhesions issues, warping, over or under extrusion, surface finish defects, stringing or oozing, support structure issues, infill-related issues such as gaps or inadequate infill, nozzle clogs or misprints, material defects, and many more. For example, at this step, print code modification program 150 may leverage tracked data from a camera 'C1' to identify a defect 'D1' related to over-extrusion form excessive filament deposition causing a part of the print operation to be larger than intended, affecting dimensions and details when compared to the desired specifications.

Next, at 206, print code modification program 150 may, in response to identifying the defect associated with the printing operation, pause the printing operation. Returning to the example above, at this step, after identifying exemplary defect 'D1', print code modification program 150 would pause the printing operation to proceed with remediating the detected defect before continuing the printing operation.

At 208, print code modification program 150 may generate remediating g-code alterations based on the identified defect and the set of desired specifications. In embodiments, an exemplary remediation module 340 (See FIG. 3) of print code modification program 150 may, based on the identified defect, generate remediating g-code alterations to accommodate the errors or detected deviations associated with the defect. Exemplary remediation module 340 may leverage suitable 3D modeling software and slicing software to generate remediating g-code alterations designed to correct parameters or variables associated with the identified defect. For example, if print code modification program 150 identifies the defect 'D1' related to over-extrusion from excessive filament deposition causing a part of the print operation to be larger than intended, affecting dimensions and details when compared to the desired specifications, then exemplary remediation module 340 may generate remediating g-code alterations configured to modify the flow rate or extrusion multipliers in the g-code to mitigate the over-extrusion.

Then, at 210, print code modification program 150 may generate a first digital twin corresponding to the set of desired specifications, and a second digital twin corresponding to the generated remediating g-code alterations. While the generated remediating g-code alterations from step 208 are configured to address the detected defect, print code modification program 150 is further configured to generate and leverage a pair of digital twins to ensure that any altered settings, modified dimensions, or other variable adjustments present in the remediating g-code alterations do not adversely affect the printing operation. Leveraging of the pair of digital twins to perform rebasing will be discussed below in connection with step 212. At this step, the first generated digital twin corresponds to a simulated model of the printing operation, according to the desired specifications. Whereas the second generated digital twin corresponds to simulations of the printing operation based on the generated remediating g-code alterations designed to address the detected defect.

At 212, print code modification program 150 may rebase the paused printing operation based on the generated remediating g-code alterations and the first and second digital twins. As discussed above, applying the remediating g-code alterations typically involves utilizing modified variables and settings. Rebasing ensures that the changes made in the remediating g-code alterations are consistently applied throughout the entire print job, where appropriate, while mitigating risk of a variety of negative externalities that may occur. For example, rebasing may help correct any slicing errors or inaccuracies that may occur due to the altered g-code, ensuring the printer follows the intended path and extrusion rates. In other settings, altering g-code without rebasing may cause subsequent layers to align incorrectly, leading to misalignment and print failure. Accordingly, remediation module 340 of print code modification program 150 may be configured to rebase the printing operation to ensure that the generated g-code alterations are applied without negatively impacting the printing operation. In embodiments, the rebasing process performed by remediation module 340 may leverage both the pair of digital twins from step 210 and the remediating g-code alterations. In embodiments, print code modification program 150 may perform rebasing by providing instructions to printer 310 resulting in adjustment or modification of the base or platform on which the print is being built. Exemplary adjustments or modifications to the bed or platform may include, for example, cleaning a build surface, applying adhesives to a build surface, changing a build surface to improve adhesion, leveling the bed to ensure alignment with the printer's head, calibrating various printer settings, or employing various printing aids such as brims or rafts, applying any suitable post-processing techniques to a build surface, or any other suitable known adjustments or modifications that may be made to the base or platform on which the printing operation is being built.

Thereafter, at 214, print code modification program 150 may leverage the generated remediating g-code alterations to resume the rebased paused printing operation. After rebasing, print code modification program 150 is able to resume the printing operation using the remediating g-code alterations to accommodate the identified defects or deviations and complete the printing operation.

In embodiments, print code modification program 150 may be further configured to automatically determine if a given printing operation is salvageable after it has been paused due to the detection of a defect. In such embodiments, for example, remediation module 340 of print code modification program 150 may be configured to automatically compare the desired specifications of a given printing operation with the tracked print data and other defect parameters (such as degree of mistake, rebasing success degree, etc.) to make a determination of whether to salvage a given printing operation. In embodiments, for example, print code modification program 150 may be configured to calculate scores corresponding to the likelihood of successfully salvaging target print operations having a defect, and then automatically remediate the printing operations having a calculated score being above a predetermined threshold. Conversely, if the calculate score is below the predetermined threshold, print code modification program 150 may terminate the printing operation. In other embodiments, the calculated score may be output to a user via a suitable user interface, along with a request for manual input from the user regarding whether to remediate (salvage) or terminate a given printing operation that has experienced an error or deviation.

It may be appreciated that print code modification program 150 has thus provided improved dynamic modification of print codes to accommodate printing defects or errors by tracking print data that may be leveraged to detect a defect based on the original set of desired specifications. Described embodiments leverage the desired specifications and the detected defect to generate g-code alterations that accommodate and remediate the detected defect. Described embodiments further leverage a pair of digital twins representing both the desired specification and the printing operation at the time the defect was detected, to rebase the printing operation before resuming the rebased paused print operation using the generated g-code alterations. This allows for the accommodation of errors related to a given 3D print operation, thereby avoiding the costs associated with scrapping or canceling the entire print.

It may be appreciated that FIGS. 2-3 provide only illustrations of an exemplary implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for dynamically modifying print code, the method comprising, comprising:

tracking print data associated with a printing operation against a set of desired specifications;

identifying a defect in the printing operation based on the tracked print data;

in response to identifying the defect associated with the printing operation, pausing the printing operation;

determining a likelihood of successfully salvaging the printing operation based on a calculated score and a predetermined threshold value;

based on the calculated score being below the predetermined threshold value, generating remediating g-code alterations based on the identified defect and the set of desired specifications;

generating a first digital twin corresponding to the set of desired specifications, and a second digital twin corresponding to the generated remediating g-code alterations;

rebasing the paused printing operation based on the generated remediating g-code alterations and the first and second digital twins; and leveraging the generated remediating g-code alterations to resume the rebased paused printing operation.

2. The computer-based method of claim 1, wherein tracking the print data associated with the printing operation against the set of desired specifications further comprises:

leveraging a series of sensors associated with the printing operation, the series of sensors including one or more internal printer sensors, external sensors, and data feeds.

3. The computer-based method of claim 2, wherein identifying the defect in the printing operation based on the tracked print data further comprises:

comparing the tracked print data to the desired set of specifications to identify any deviations or errors.

4. The computer-based method of claim 1, further comprising:

terminating the print operation in response to the calculated score being below the predetermined threshold value.

5. The computer-based method of claim 1, further comprising:

outputting the calculated score to a user interface; and receiving manual input, via the user interface, to remediate or terminate the printing operation.

6. The computer-based method of claim 1, wherein the printing operation comprises a 3D printing operation.

7. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

tracking print data associated with a printing operation against a set of desired specifications;

identifying a defect in the printing operation based on the tracked print data;

in response to identifying the defect associated with the printing operation, pausing the printing operation;

determining a likelihood of successfully salvaging the printing operation based on a calculated score and a predetermined threshold value;

based on the calculated score being below the predetermined threshold value, generating remediating g-code alterations based on the identified defect and the set of desired specifications;

generating a first digital twin corresponding to the set of desired specifications, and a second digital twin corresponding to the generated remediating g-code alterations;

rebasing the paused printing operation based on the generated remediating g-code alterations and the first and second digital twins; and leveraging the generated remediating g-code alterations to resume the rebased paused printing operation.

8. The computer system of claim 7, wherein tracking the print data associated with the printing operation against the set of desired specifications further comprises:

leveraging a series of sensors associated with the printing operation, the series of sensors including one or more internal printer sensors, external sensors, and data feeds.

9. The computer system of claim 8, wherein identifying the defect in the printing operation based on the tracked print data further comprises:

comparing the tracked print data to the desired set of specifications to identify any deviations or errors.

10. The computer system of claim 7, further comprising:

terminating the print operation in response to the calculated score being below the predetermined threshold value.

11. The computer system of claim 7, further comprising:

outputting the calculated score to a user interface; and receiving manual input, via the user interface, to remediate or terminate the printing operation.

12. The computer system of claim 7, wherein the printing operation comprises a 3D printing operation.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

tracking print data associated with a printing operation against a set of desired specifications;

identifying a defect in the printing operation based on the tracked print data;

in response to identifying the defect associated with the printing operation, pausing the printing operation;

determining a likelihood of successfully salvaging the printing operation based on a calculated score and a predetermined threshold value;

based on the calculated score being below the predetermined threshold value, generating remediating g-code alterations based on the identified defect and the set of desired specifications;

generating a first digital twin corresponding to the set of desired specifications, and a second digital twin corresponding to the generated remediating g-code alterations;

rebasing the paused printing operation based on the generated remediating g-code alterations and the first and second digital twins; and leveraging the generated remediating g-code alterations to resume the rebased paused printing operation.

14. The computer program product of claim 13, wherein tracking the print data associated with the printing operation against the set of desired specifications further comprises:

leveraging a series of sensors associated with the printing operation, the series of sensors including one or more internal printer sensors, external sensors, and data feeds.

15. The computer program product of claim 14, wherein identifying the defect in the printing operation based on the tracked print data further comprises:

comparing the tracked print data to the desired set of specifications to identify any deviations or errors.

16. The computer program product of claim 13, further comprising:

terminating the print operation in response to the calculated score being below the predetermined threshold value.

17. The computer program product of claim 13, further comprising:

outputting the calculated score to a user interface; and receiving manual input, via the user interface, to remediate or terminate the printing operation.

* * * * *